(12) United States Patent
Kohn et al.

(10) Patent No.: US 6,827,391 B1
(45) Date of Patent: Dec. 7, 2004

(54) SPORT UTILITY SOFT TOP WITH REMOVABLE PANELS

(75) Inventors: Dorothy N Kohn, Longmont, CO (US); Richard C Essig, Berthoud, CO (US)

(73) Assignee: Bestop, Inc., Broomfield, CO (US)

( * ) Notice: Subject to any disclaimer, the term of this patent is extended or adjusted under 35 U.S.C. 154(b) by 0 days.

(21) Appl. No.: 10/766,615

(22) Filed: Jan. 28, 2004

Related U.S. Application Data

(60) Provisional application No. 60/516,645, filed on Oct. 31, 2003.

(51) Int. Cl.[7] ................................................ B60J 1/12
(52) U.S. Cl. ............................ 296/146.14; 296/107.07; 160/327
(58) Field of Search ........................ 296/107.01, 107.07, 296/146.14, 102, 148; 160/327, 180

(56) References Cited

U.S. PATENT DOCUMENTS

| | | | |
|---|---|---|---|
| 2,620,224 A | * | 12/1952 | Hedley .......................... 296/148 |
| 3,719,013 A | | 3/1973 | Blick |
| 3,833,046 A | | 9/1974 | Tombu |
| 4,220,298 A | * | 9/1980 | Willis ........................ 244/129.5 |
| 4,452,294 A | | 6/1984 | Fukuchi |
| 4,600,235 A | | 7/1986 | Frederick et al. |
| 4,757,854 A | | 7/1988 | Rippberger |
| 4,930,835 A | * | 6/1990 | Bruce et al. ................ 296/102 |
| 5,033,787 A | | 7/1991 | Takada |
| 5,058,340 A | | 10/1991 | Muller |
| 5,702,147 A | | 12/1997 | Essig |
| 5,765,903 A | | 6/1998 | Essig et al. |
| 6,036,256 A | | 3/2000 | Hilliard et al. |
| 6,286,888 B1 | * | 9/2001 | Essig ......................... 296/102 |
| 2003/0066551 A1 | * | 4/2003 | Sofie et al. ................. 135/121 |

FOREIGN PATENT DOCUMENTS

CA                486792           9/1952

* cited by examiner

Primary Examiner—Patricia L. Engle
(74) Attorney, Agent, or Firm—W. Scott Carson

(57) ABSTRACT

A vehicle soft top with a main body and removable panels. Each panel is at least partially received in a conforming cutout section in the main body and has a plurality of sides with the upper side preferably secured to the upper side of the cutout section by a pair of interconnecting, sliding members. The interconnecting members have mating hook portions that can be aligned with one another and slid axially relative to each other to hold the upper sides of the panel and main body together. A zipper is preferably used to secure second sides of the panel and cutout section together and the remaining sides are preferably secured together with either belt and channel arrangements or additional zippers.

37 Claims, 9 Drawing Sheets

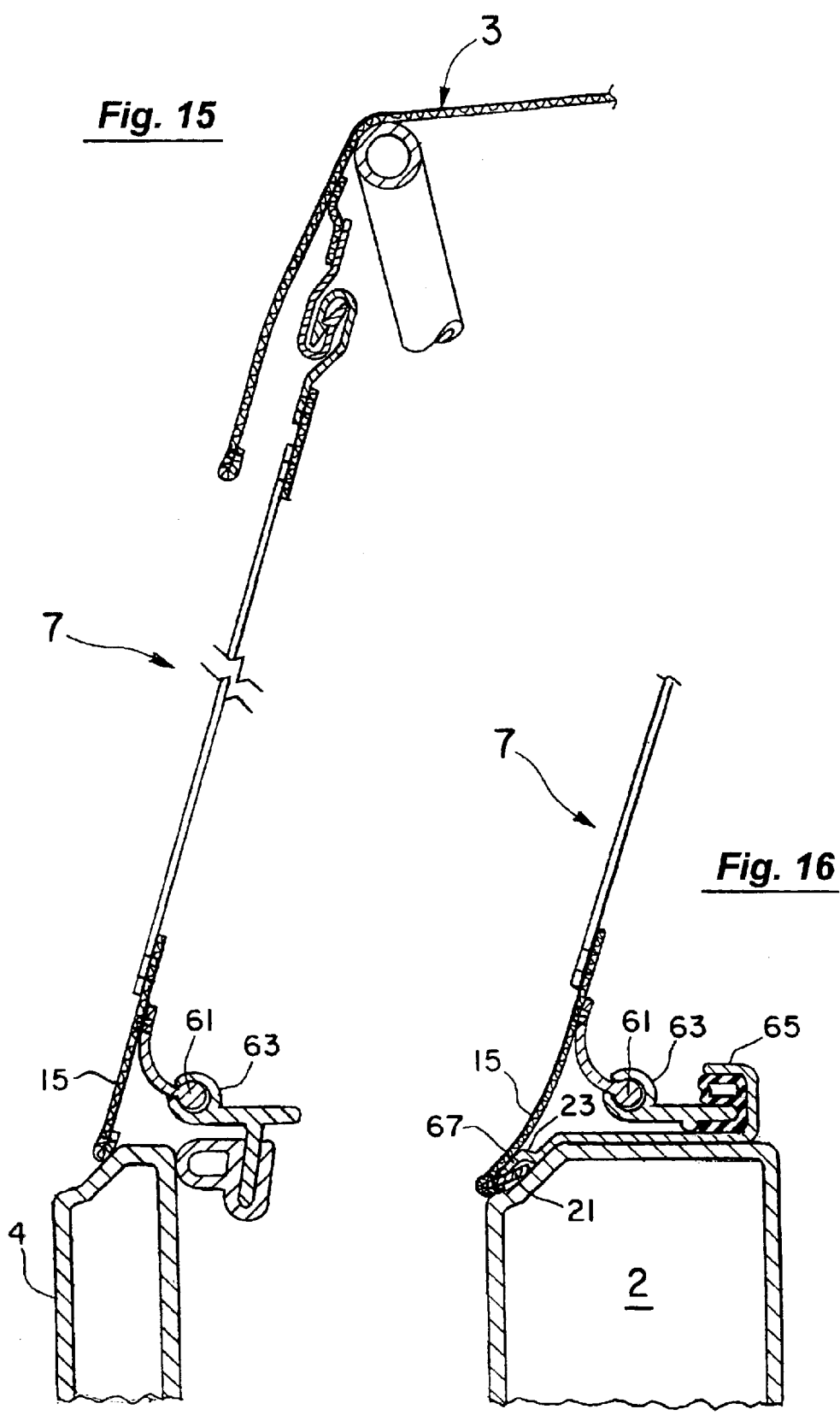

SPORT UTILITY SOFT TOP WITH REMOVABLE PANELS

RELATED APPLICATIONS

This application claims the benefit of U.S. Provisional Patent Application Ser. No. 60/516,645 filed Oct. 31, 2003, which is incorporated herein by reference.

BACKGROUND OF THE INVENTION

1. Field of the Invention

This invention relates to the field of soft tops for sport utility and similar vehicles and more particularly to the field of such tops with removable window and other panels.

2. Discussion of the Background

Vehicle soft tops with removable window and other panels are very popular as they offer the user many options. When in place, the panels serve to protect the user and contents of the vehicle from the elements and when removed allow the user to fully enjoy an open air experience and to readily see and retrieve objects in the vehicle. Such panels are commonly secured in a removable manner to the deck or main body of the soft top with zippers on the sides of the panel. Although zippers are relatively easy to operate, they add expense to the top and can create undesirable waves in the panel, particularly window panels that have a clear plastic film.

More specifically, such removable panels typically have zippers along at least two of their sides and it often occurs that the two zippers are not perfectly aligned or oriented. Consequently, they do not cooperate together as intended to evenly tension the panel so it will lie flat. This can be due to a number of factors including wear and exposure. It can also be a result of the tracks of each zipper not being originally attached (e.g., sewn) in exact alignment with each other or exact orientation with the tracks of the other zipper. As indicted above, the attached panel then does not lie flat and waves or undulations are created in it which are particularly noticeable in the clear film of a window panel. Such waves detract not only from the overall appearance of the top but also from the viewing through the window panel. With panels secured to the main body of the soft top by three or more zippers along their sides, this problem is only compounded.

With this and other problems in mind, the present invention was developed. In it, an attaching arrangement is provided to easily and quickly secure a removable panel in place with reduced risk that undesirable waves or undulations will be created.

SUMMARY OF THE INVENTION

This invention involves a vehicle soft top with a main body and removable panels. Each panel is at least partially received in a conforming cutout section in the main body. Each panel has a plurality of sides with the upper side preferably secured to the upper side of the cutout section by a pair of interconnecting, sliding members. The interconnecting members have mating hook portions that can be aligned with one another and slid axially relative to each other to hold the upper sides of the panel and main body together. A zipper is preferably used to secure second sides of the panel and cutout section together and the remaining sides are preferably secured together with either belt and channel arrangements or additional zippers.

In use, each removable panel can be easily and quickly secured in place by initially aligning and axially sliding the mating hook portions on the upper sides of the panel and cutout section relative to each other. With the upper sides held together, the zipper along adjacent second sides of the panel and cutout section can be closed. In one embodiment, the third and fourth sides of the panel are then respectively secured by belt and channel members to a vertically extending section of the door frame and a horizontally extending section of the vehicle. In doing so, the interconnecting members along the upper sides of the panel and cutout section are free to axially slide relative to each other in response to uneven tensions or forces created in the panel during the attachment of the remaining sides. The result is that undesirable waves or undulations that often occur in conventional panels (because the upper sides of the panel and cutout section are fixedly secured to each other as by a zipper) are eliminated or at least greatly reduced. Additionally, the assembly and disassembly time and effort to insert and remove the panel are simplified and cost savings are realized in eliminating a zipper along the upper sides of the panel and cutout section. Such advantages are also realized in other embodiments of the present invention that slidably attach the upper sides of the panel and cutout section together but use attachments other than belt and channel members along the remaining sides.

BRIEF DESCRIPTION OF THE DRAWINGS

FIG. 15 is a view taken along line 15—15 of FIG. 1.

FIG. 16 is a view taken along line 16—16 of FIG. 1.

DETAILED DESCRIPTION OF THE INVENTION

Figure 1:
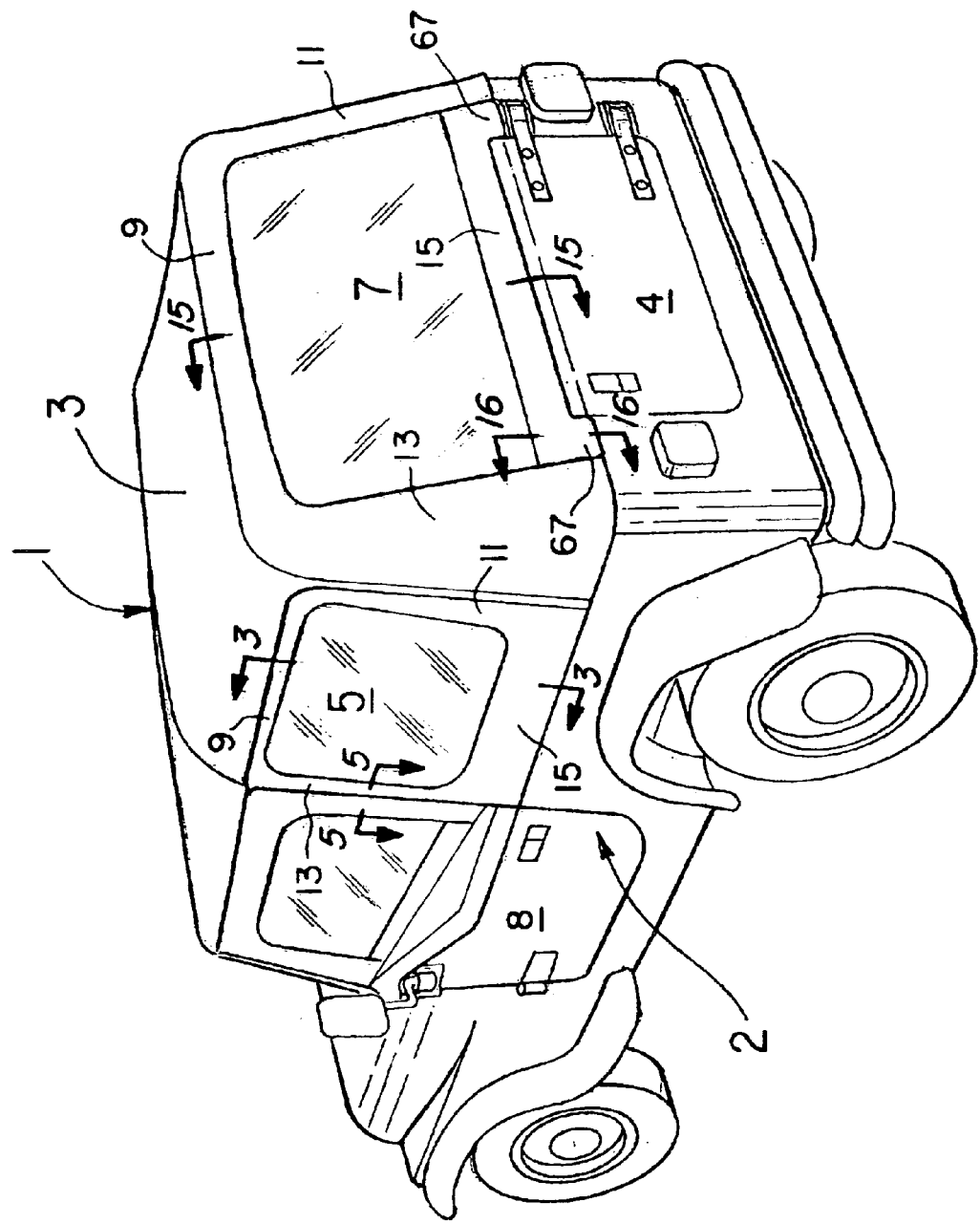
FIG. 1 is a perspective view of a sport utility vehicle with the soft top of the present invention mounted on it.

As shown in FIG. 1, the present invention involves a soft top 1 for a sport utility or similar vehicle 2. The illustrated soft top 1 has a deck or main body 3 with removable side and rear panels 5 and 7. Each panel 5 and 7 as shown has a plurality of sides (e.g., four) defining a perimeter shape. The main body 3 of the vehicle soft top 1 in turn has respective cutout sections 5' and 7' (see FIG. 2) defined by a plurality of sides to respectively receive the panels 5 and 7. The cutout section 5' in this regard (see again FIG. 2) has first and second sides 9' and 11' substantially conforming in shape and orientation to the first and second sides 9 and 11 (FIG. 1) of the side panel 5. Similarly, the rear cutout section 7' (FIG. 2) has three sides 9', 11', and 13' substantially conforming in shape and orientation to the three sides 9, 11, and 13 of the rear panel 7 (FIG. 1). The remaining or lower side 15 of the rear panel 7 as explained in more detail below extends across the tailgate opening above the tailgate 4.

Figure 2:
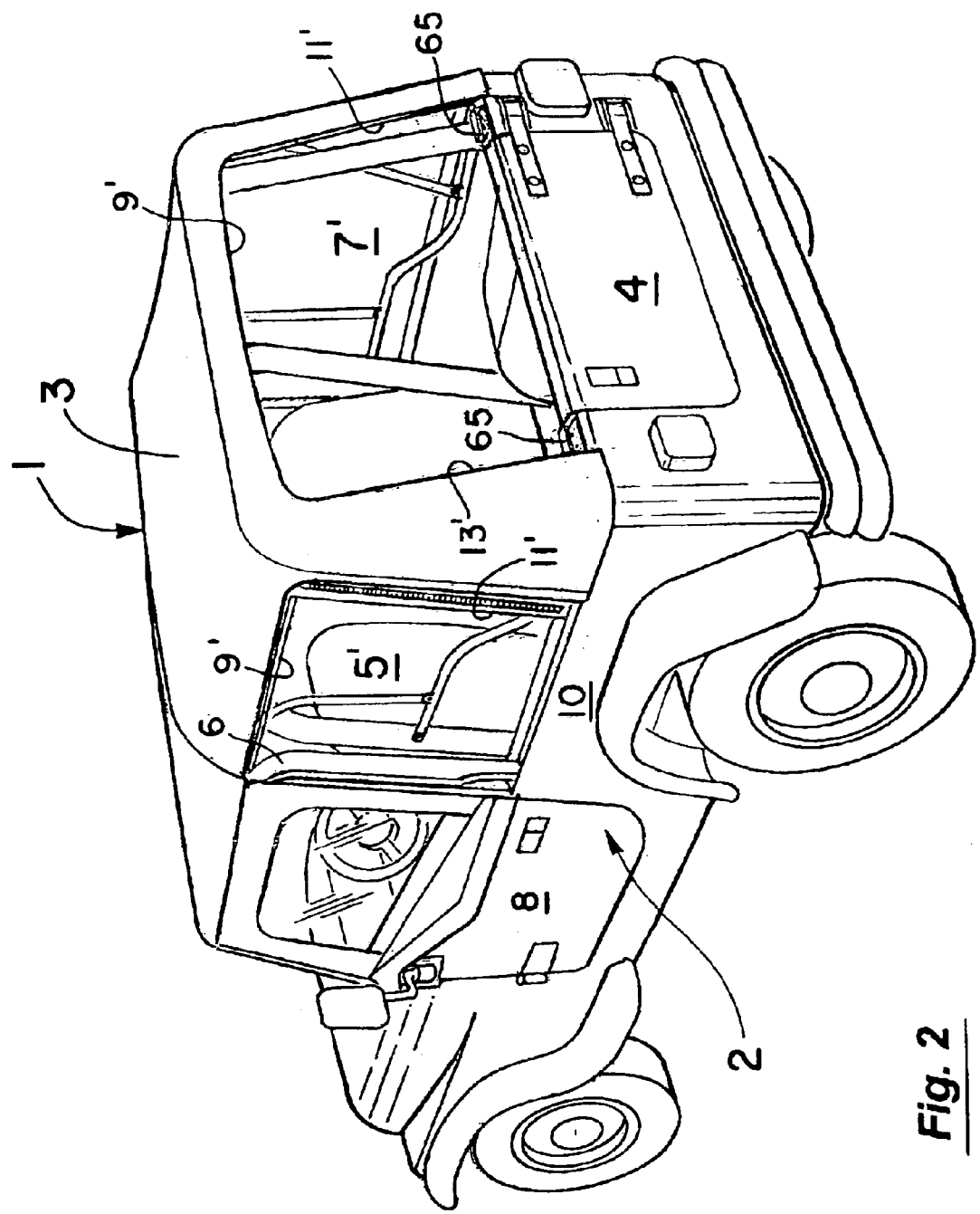
FIG. 2 is a perspective view of the vehicle with the side and rear panels of the soft top removed.
Figure 3:
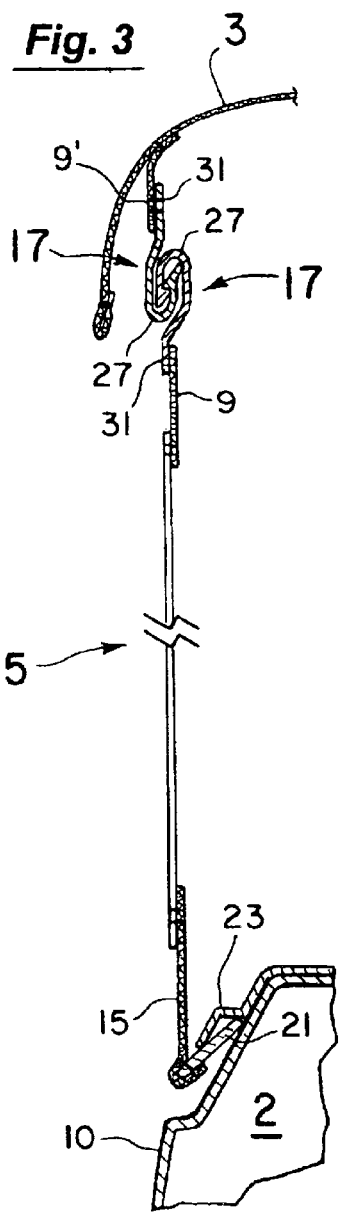
FIG. 3 is a view taken along line 3—3 of FIG. 1.
Figure 4:
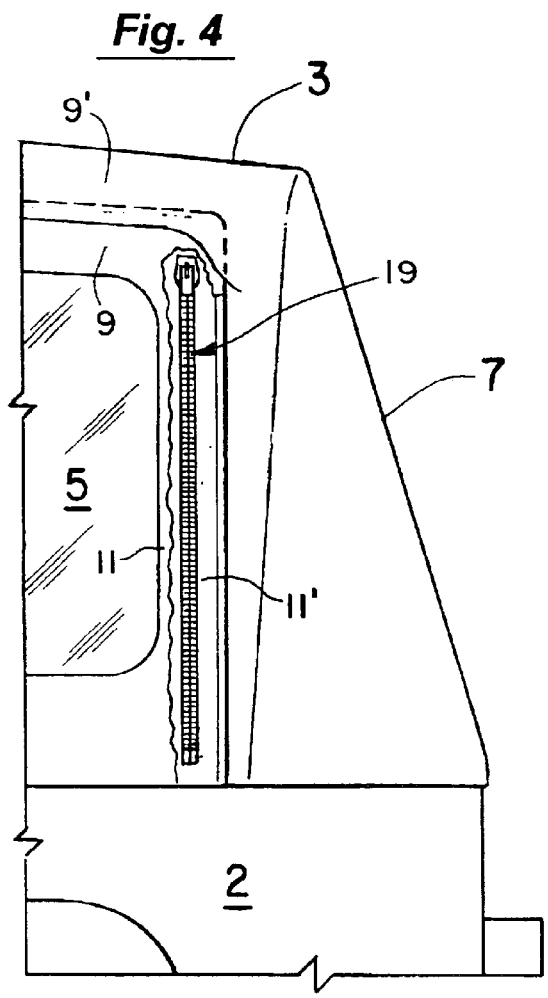
FIG. 4 illustrates the zipper attachment between the sides of the deck or main body of the soft top and the removable side panel of FIG. 1.
Figure 5:
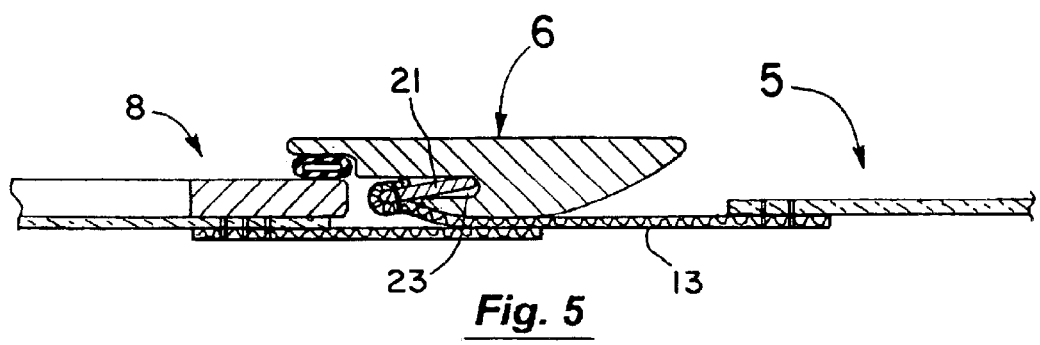
FIG. 5 is a view taken along line 5—5 of FIG. 1.

Referring initially to the side or quarter panel 5 of FIG. 1 and in the preferred embodiment, the panel 5 is removably secured to the main body 3 of the soft top 1 of FIG. 2 along the respective first or upper sides 9 and 9' of the panel 5 and cutout section 5' by a pair of slidably interconnecting members 17 (see FIG. 3). The respective second sides 11 and 11' of the panel 5 and main body 3 are then preferably removably secured to each other by a zipper 19 (see FIG. 4). The third or left side 13 of the panel 5 in FIG. 1 is preferably removably secured to the vertically extending section 6 of the door frame (see FIGS. 1, 2, and 5) by an arrangement of an elongated belt member 21 and open channel member 23 (FIG. 5). The belt member 21 as shown is attached (e.g., sewn) along the third side 13 of the panel 5 which is then receivable in the open channel member 23 on, the vertically extending section 6 of frame for the door 10. In a similar manner, the lower or fourth side 15 of the panel 5 in FIG. 1 is preferably removably secured to the horizontally extending body section 10 of the vehicle 2 (see again FIG. 3) by a belt member 21 and open channel member 23.

Figure 6:
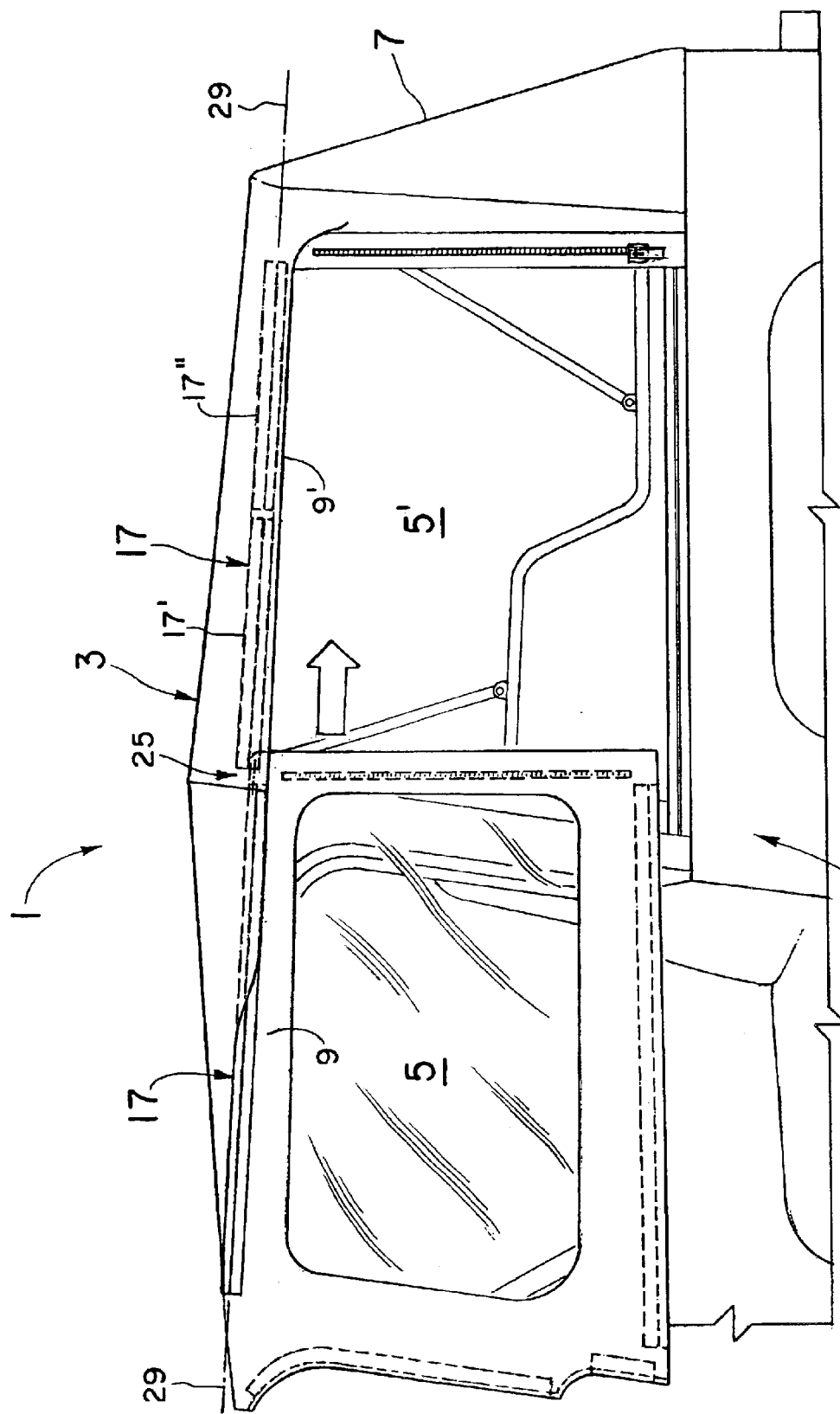
FIGS. 6–10 illustrate the assembly steps to secure the removable side panel to the main body of the soft top.
Figure 7:
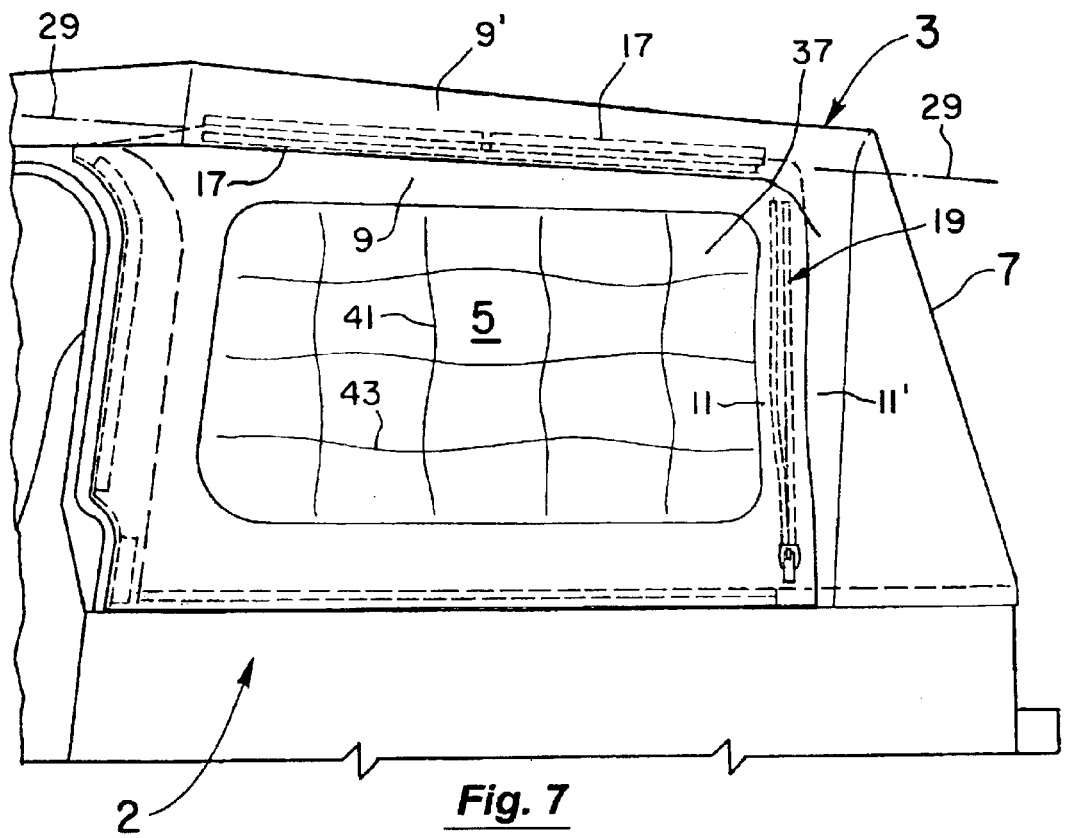

In use as illustrated in FIGS. 6–10, the removable panel 5 can be easily and quickly positioned in place in the cutout section 5' of the main body 3 of the soft top 1. In doing so, the free ends at 25 of the hook portions 27 of the interconnecting members 17 (see FIGS. 6 and 3) are initially aligned in an overlapping manner. The hook portion 27 attached to the upper side 9 of the panel 5 is then slid along the substantially horizontal axis 29 in FIG. 6 relative to the upper side 9' of the main body 3 from the position of FIG. 6 to that of FIG. 7. In the position of FIG. 7, the upper sides 9,9' of the panel 5 and main body 3 are aligned and secured together by the overlapping and mating hook portions 27 of the interconnecting member 17 (see also FIG. 3). The elongated hook portions 27 in this regard extend along respective axes 29, which axes 29 are substantially collinear in the overlapping position of FIG. 7. The stem portions 31 of the interconnecting members 17 (see again FIG. 3) are attached (e.g., sewn) along the respective sides 9,9' of the panel 5 and main body 3. Both the stem 31 and hook 27 portions are preferably elongated as best seen in FIG. 6 in respective directions along the sides 9 and 9'. If desired, each elongated member 17 can be a single piece extending along the entire length of the sides 9 and 9' or can be two or more axially aligned sections such as 17' and 17" on side 9' in FIG. 6. Multiple sections such as 17' and 17" in FIG. 6 can serve to facilitate folding the main body 3 of the soft top 1 into a relatively small shape when not in use. It is also noted at this point that the section 5' of the main body 3 is referred to here and commonly in the industry as a cutout section; however, it can be formed in the original pattern of the main body or in any number of ways beyond being literally cut from the main body.

Figure 8:
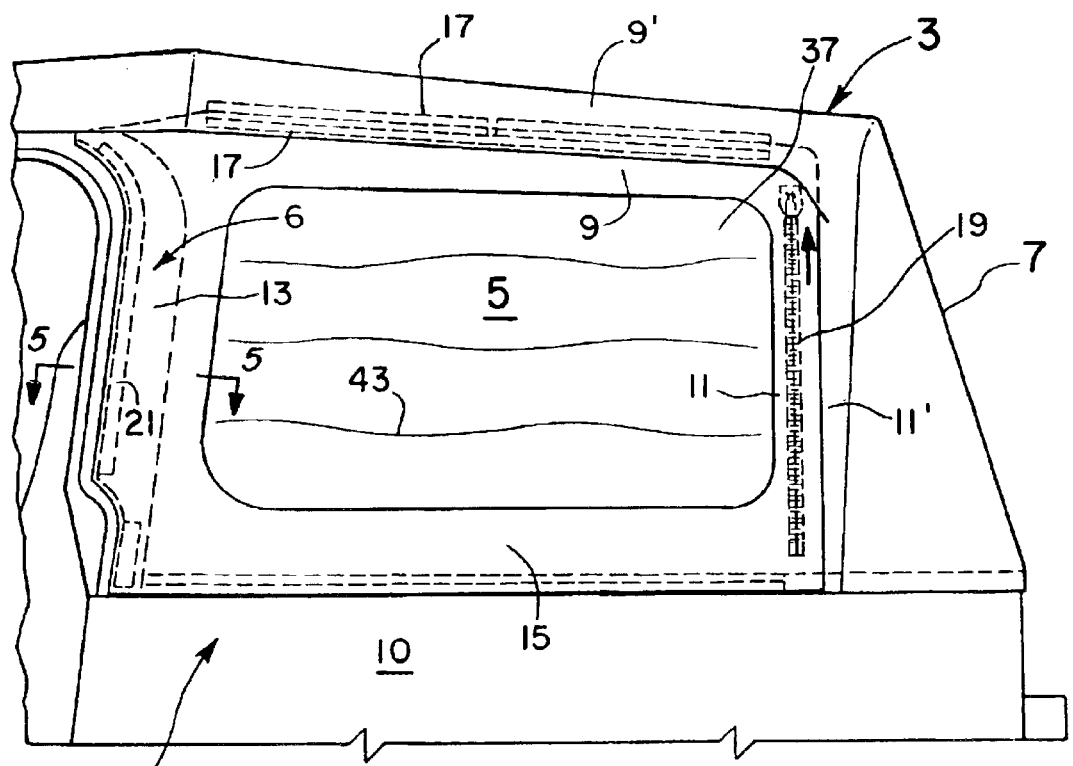

Referring again to FIG. 7 and once in this position with the upper sides 9 and 9' secured together, the right sides 11 and 11' of the panel 5 and main body 3 can be secured together by the zipper 19 as illustrated in FIG. 8. At this point, the left side 13 of the panel 5 is preferably still unsecured wherein the left side 13 can then be drawn or pulled to the left in FIG. 8 to secure the belt 21 into the open channel member 23 on the vertically extending section 6 of the door frame (see also FIG. 5). Similarly, the lower side 15 of the panel 5 can be secured by a belt and channel member arrangement 21,23 to the horizontally extending section 10 of the vehicle 2 in the manner illustrated in FIGS. 9 and 10.

Figure 9:
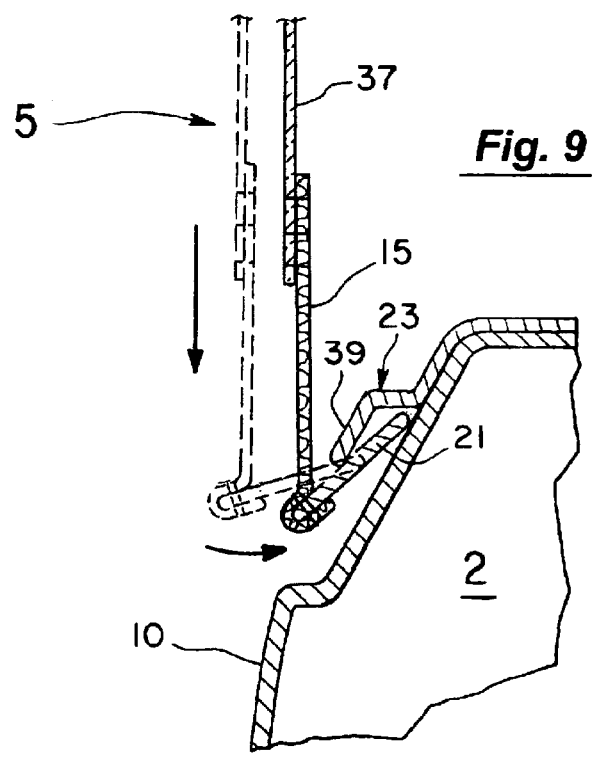

As shown in FIG. 9 and in inserting the belt member 21 into the channel member 23, the panel 5 including the clear, flexible plastic window 37 (e.g., polyvinylchloride) is first drawn taut with the belt 21 positioned as illustrated in dotted lines in FIG. 9 against the leg 39 of the channel member 23. Using the free end of the leg 39 as a fulcrum, the belt 21 is then manually rotated to align with and be received in the open channel member 23 as shown in solid lines in FIG. 9. This operation is the same as that of the belt 21 and channel member 23 on the sides 13,13' in FIGS. 5 and 8.

Figure 10:
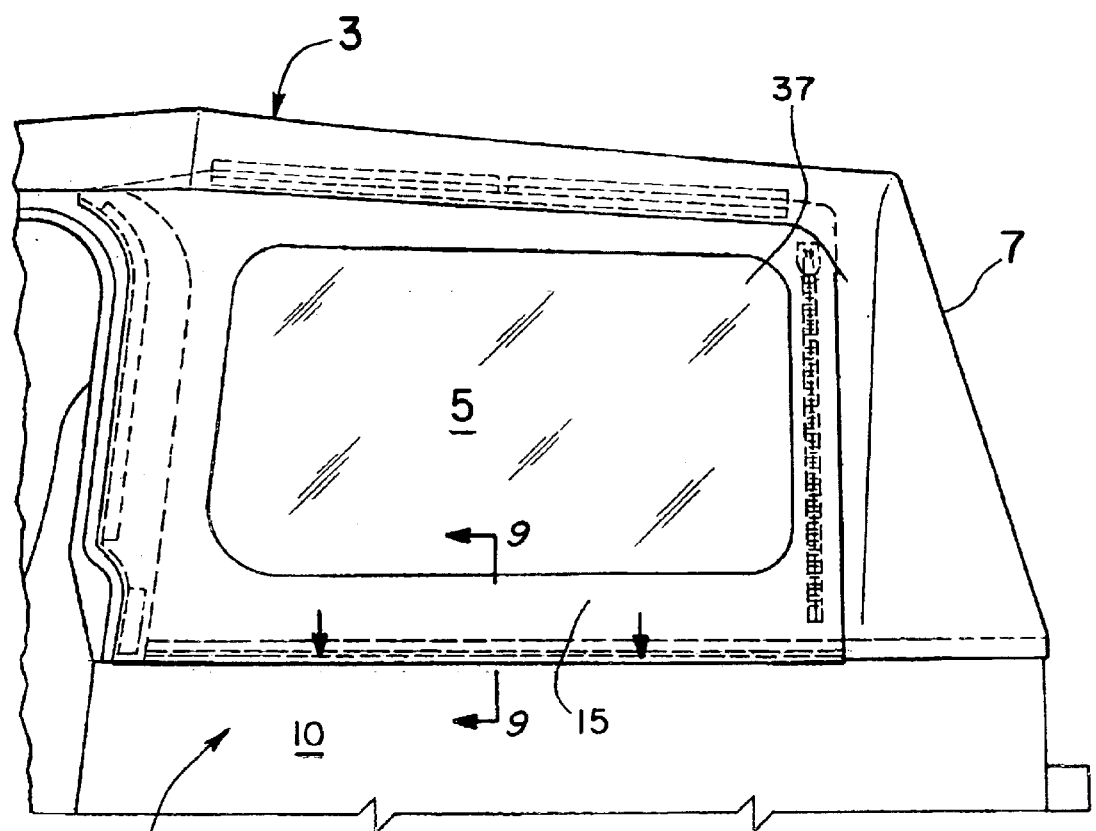

The ability of the hook portions 27 of the interconnecting member 17 on the upper sides 9 and 9' of the panel 5 and main body 3 of the vehicle soft top 1 to axially slide relative to each other offers multiple advantages. Initially as discussed above, it enables the quick and easy securement of the upper sides 9 and 9' together (FIG. 6) by a simple alignment and sliding of the members 17 relative to each other. It also serves to hold or hang the panel 5 in place (FIG. 7) so the operator is free to use both hands to manipulate the zipper 19 to secure the sides 11 and 11' together (FIG. 8). Similarly, the operator can thereafter use both hands to secure the panel sides 13 and 15 to the vehicle 2. Beyond facilitating the attachment of the panel 5 to the main body 3, the ability of the interconnecting member 17 to axially slide relative to each other also aids in removing undesirable waves or undulations in the panel 5, particularly the flexible window 37. More specifically and again referring to FIGS. 6–10, the panel 5 (whether made of a single piece of flexible materials such as vinyl and canvas or provided with a window 37 or mesh in the middle) has a tendency to fold or wrinkle when untensioned. Consequently, in the position of FIG. 7, waves or undulations such as 41 and 43 often appear in the panel 5 including its window 37. However, with the present invention and once the right sides 11 and 11' are secured together by the zipper 19 (FIG. 8), the interconnecting members 17 along the upper sides 9 and 9' can slide relative to each other as the panel 5 is drawn taut to the left in FIG. 8 and secured to the vertically extending section 6 of the door frame. This sliding ability of the members 17 essentially allows the panel 5 to be self-centering and !will serve to reduce or eliminate many of the waves in the panel 5 of FIG. 7 including the vertical waves 41 (compare FIGS. 7 and 8). The subsequent securement of the lower side 15 of the panel 5 to the horizontally extending section 10 of the vehicle 2 in the manner of FIG. 9 will similarly aid in reducing or eliminating the horizontal waves 43 of FIG. 8 (compare FIGS. 8 and 10). The result is a relatively flat, waveless panel 5 (FIG. 10).

In contrast, present panels such as 5 are normally fixedly secured in place to the main body 3 in a predetermined position along the upper side 9 (e.g., by a zipper or snaps). Consequently, no physical adjustment or reaction to uneven forces created in the panel 5 is possible to reduce or eliminate undesirable waves as is the case with the sliding members 17 of the present invention. Perfectly aligned zippers or snaps along the sides 9 and 9' can greatly reduce the development of waves. However, such perfect alignments are often difficult to accomplish during mass production of the tops 1, particularly when the zipper tracks are manually sewn in place. Further, as the panel 5 and main body 3 of such tops 1 (e.g., vinyl, canvas, fabric, or similar flexible and foldable materials) age and weather in use, originally perfect alignments may be altered creating uneven tension in the panel 5 producing undesirable waves. Such problems are substantially avoided or eliminated by the present invention. Further, great financial savings are also achieved by eliminating the need for zippers along the upper sides 9 of the panels 5. Additionally, by using the slidable and relatively watertight attachment of the hook portions 27, other inherent disadvantages of zippers are avoided. As for example, zippers can sometimes be hard to start in cold or bad weather, dirt can foul up the zipper tracks, and water can pass thorough the teeth of the zipper tracks.

Figure 11:
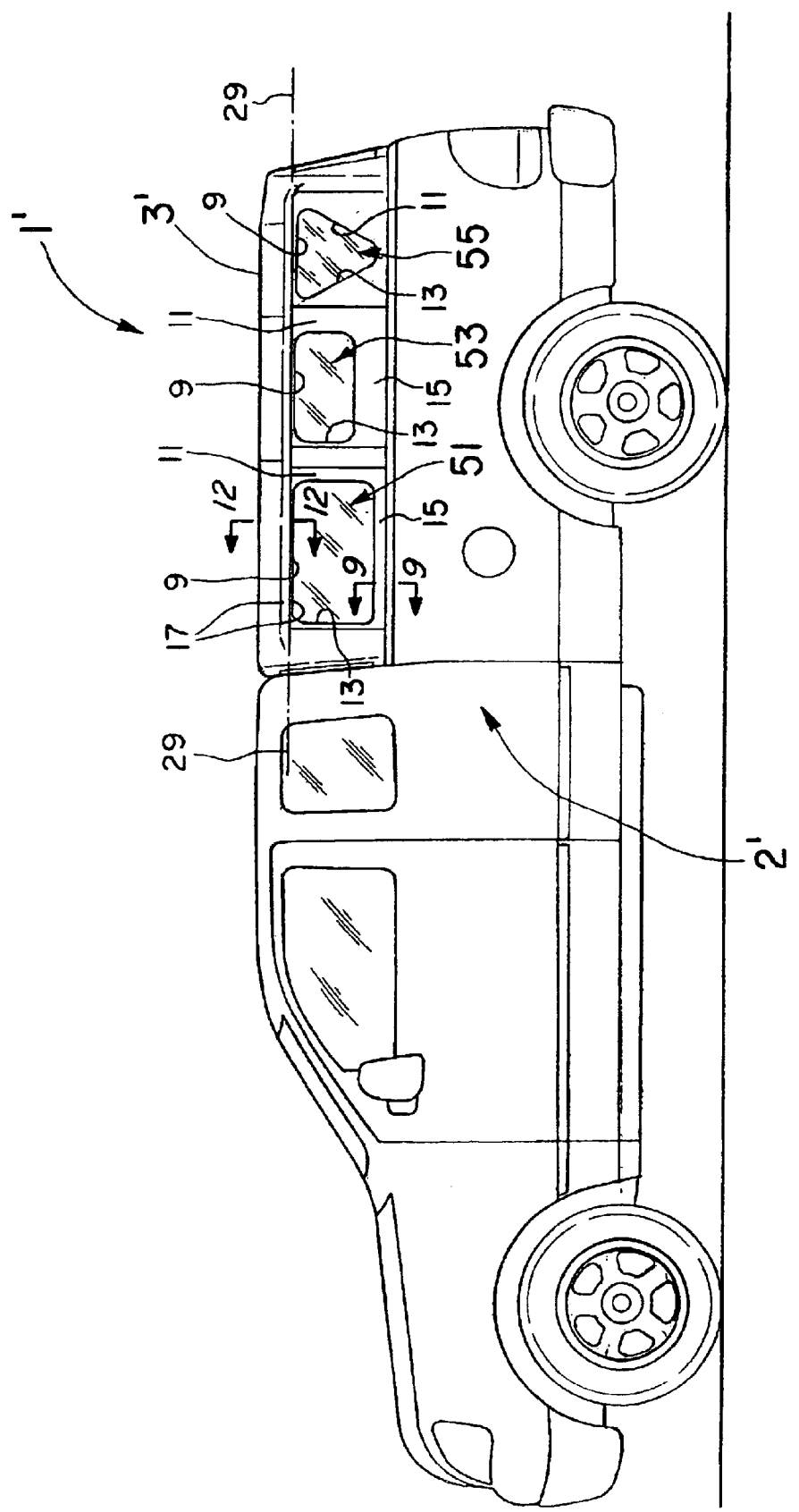
FIG. 11 is a side elevational view of a pickup truck with a soft top according to the present invention mounted over its bed.

The sliding members 17 along the upper sides 9 and 9' of the panel 5 and main body 3 offer similar assembly, cost, and esthetic advantages even when zippers are used on more than one side of the removable panels as illustrated in FIG. 11. In the panel 51, for example, zippers are used along opposing, vertical sides 11 and 13. The sides 11 and 13 in this regard are substantially parallel to each other and extend downwardly from the axis 29 of the upper side 9. In operation and in a manner similar to FIGS. 6–10, the upper sides 9 and 9' of the panel 51 and main body 3' of the soft top 1' of the pickup truck 2' are first aligned and slid into overlapping engagement. The right sides 11,11' and left sides 13,13' are then zippered together in the manner of FIG. 8 and the lower panel side 15 subsequently secured to the vehicle 2' by a belt and channel arrangement like 21,23 of FIGS. 3 and 9. The use of two zippers for panel 51 along sides 11,11' and 13,13' increases the possibility of undesirable waves being created due to misalignment of the tracks of each zipper and of the orientation of the two zippers as originally manufactured or due to aging and wear. However, the ability of the upper sides 9,9' to axially slide relative to each other still permits the panel 51 to adjust or react to uneven tension or forces created in the panel 51 to help center itself and to at least reduce and possibly eliminate unsightly waves. The same is true as to panel 53 in FIG. 11 which has zippers along sides 11, 13, and 15 as well as the three sided panel 55 which has zippers along sides 11 and 13. Regardless of the number of sides, the sliding ability of the upper sides 9,9' is desirable for ease of assembly, cost savings, and reduction or elimination of waves. In most cases, it is anticipated the panels such as 5, 7, 51, and 53 will have four sides with sides 11 and 13 being substantially vertical and parallel to each other. The sides 11 and 13 would also be substantially perpendicular to the horizontally extending sides 9 and is, which would in turn be substantially parallel to each other. The sides of the cutout section would then correspondingly be oriented.

Figure 12:
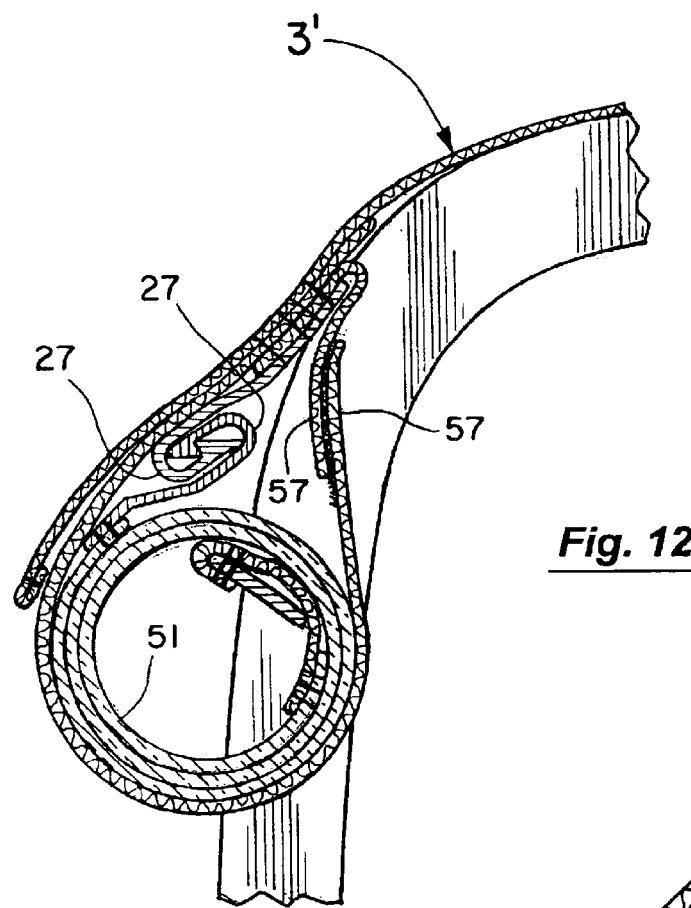
FIG. 12 is a view taken along line 12—12 of FIG. 11 showing one of the panels in a rolled up, open position.

The substantially identical, elongated hook portions 27 of the interconnection members 17 are preferably interlocking in the manner of FIG. 3. Consequently, the members 17 cannot be released or disengaged from each other by moving the members 17 vertically relative to each other in a direction substantially perpendicular to their axes 29 (see also FIG. 7). The hook portions 27 in this regard preferably have abutting barbs on the tips (FIG. 3) to prevent such movement in addition to having configurations as also illustrated that resist pulling the members 17 vertically apart. In this manner, the sides 9,9' will not be inadvertently dislodged from one another during the assembly steps of FIGS. 8–10. Also, the flexible panel such as 51 in FIG. 11 can then be folded, rolled up, or otherwise collapsed and held in place adjacent the upper side 9' of the main body 3' of the soft top 1' by a tie arrangement such as the hook and loop members 57 of FIG. 12.

Figure 13:
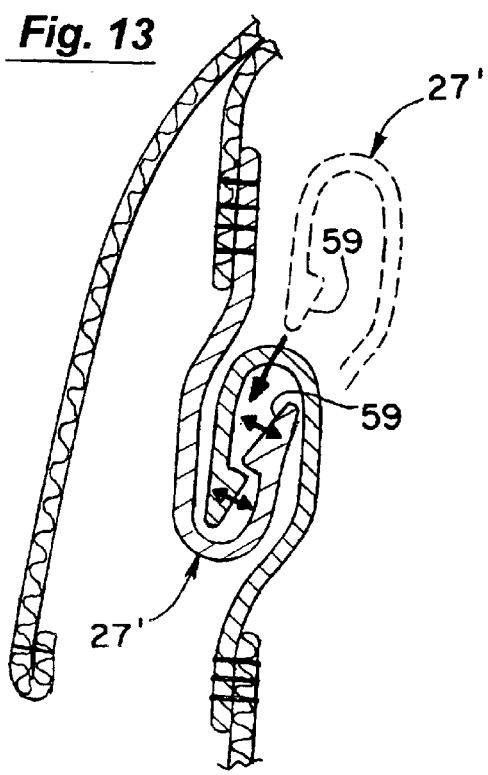
FIGS. 13 and 14 illustrate other designs for the hook portions of the interconnecting members of the present invention.
Figure 14:
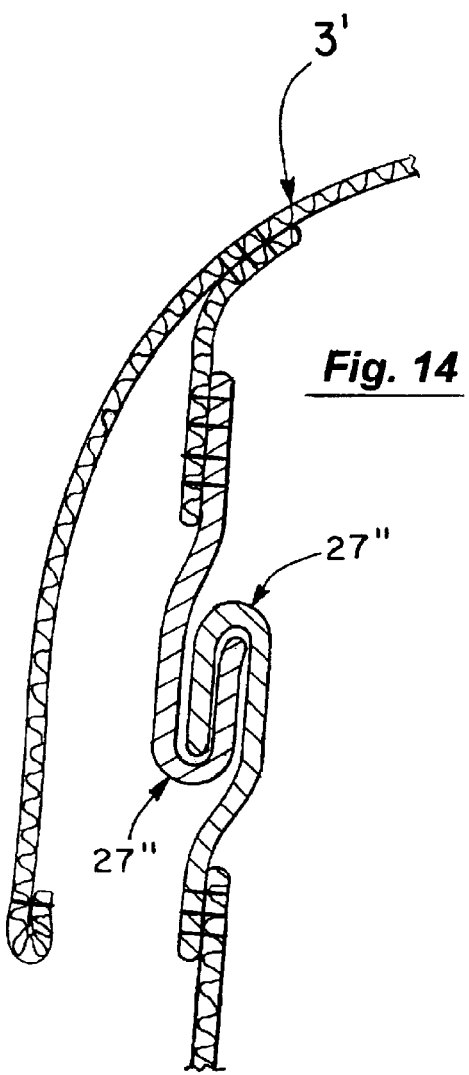

As discussed above, interlocking hook portions 27 are preferably engaged (and disengaged) by being slid axially relative to each other as in FIGS. 6 and 7 however, the hook portions such as 27, in FIG. 13 could be designed to be engaged by being moved vertically relative to each other in the orientation of FIG. 13. The barbs on the hook tips would then preferably have contacting, slanted sides 59 to facilitate assembly wherein the interfering hook portions 27' would be flexed to pass by one another and spring back into engagement. To disengage, the hook portions 27' could then be slid axially relative to each other. The hook portions could also be barbed and have a non-interference fit to pass by one another without flexing yet not be easily disengaged vertically. The barbed hook portions in this regard would tend to cock or bend axially relative to each other along their lengths and hang up on one another to resist disengagement. The hook portions such as 27" in FIG. 14 could also be barbless or otherwise designed to overlap in a non-interference manner so as to be assembled and freely moved apart vertically if desired. Regardless of whether there is an interference fit or non-interference fit between the hook portions, the hook portion on the upper side of the cutout section preferably opens or faces upwardly as illustrated to mate with the downwardly opening or facing hook portion on the upper side of the panel.

FIGS. 15 and 16 illustrate additional details of the rear panel 7 of FIG. 1 and the manner in which it is secured to the vehicle 2 of FIGS. 1 and 2. More specifically, the central portion of the lower side 15 of the rear panel 7 preferably has a bulb or dowel member 61 (FIG. 15) received in an elongated sleeve member 63 extending across the top of the tailgate opening. The ends of the elongated member or crossbar 63 are then supported in clips such as 65 (FIG. 16) on each side of the tailgate opening. The bottom edge 67 of the lower side 15 at each end can additionally be drawn taut and secured to the vehicle 2 by belt and channel members 21, 23 as illustrated in FIG. 16. The bottom edge 67 of the side 15 could also be secured to the vehicle by other arrangements (e.g., snapped to the tailgate 4) if desired as could the other panels such as 5 and 51. However, belt and channel members 21,23 as illustrated are preferred.

While several embodiments of the present invention have been shown and described in detail, it to be understood that various changes and modifications could be made without departing from the scope of the invention.

We claim:

1. A vehicle soft top having a main body and a removable panel, said panel having a plurality of sides defining a perimeter shape and said main body having a cutout section to at least partially receive said panel, said cutout section being defined by at least first and second sides in said main body substantially conforming in shape to at least first and second sides of said panel, said panel and said main body being removably securable to each other along respective first sides by at least two slidably interconnecting members and being removably securable to each other along respective second sides by a zipper, each interconnecting member having a stem portion and a hook portion, one of said interconnecting members being attached to the main body of the vehicle soft top along the first side thereof with the stem portion and hook portion being elongated in a direction along said first side, another of said interconnecting members being attached to said panel along the first side thereof with the stem portion and hook portion being elongated in a direction along said first side, said hook portion of said panel being slidably receivable with the hook portion of said main body wherein the hook portion of said panel can be aligned in an overlapping manner with the hook portion of said main body and slid relative thereto along the first side of said main body to secure said first sides together and said zipper operated to secure said second sides together.

2. The vehicle soft top of claim 1 wherein said panel and said cutout section of said main body have respective third sides and said soft top further includes a zipper to removably secure said third sides together.

3. The vehicle soft top of claim 2 wherein said second and third sides of said panel are substantially parallel to each other and said second and third sides of the cutout section of said main body are substantially parallel to each other.

4. The vehicle soft top of claim 3 wherein the first sides of the panel and main body are respectively substantially perpendicular to the second and third sides thereof.

5. The vehicle soft top of claim 4 wherein the first sides of the cutout section of said main body extends substantially horizontally along an axis and said second and third sides thereof extend substantially vertically downwardly of said axis.

6. The vehicle soft top of claim 2 wherein said panel and said cutout section of said main body have respective fourth sides and said vehicle soft top further includes a zipper to removably secure said fourth sides together.

7. The vehicle soft top of claim 1 wherein said soft top is mountable on a vehicle having a substantially vertically extending door frame section and said panel has a third side removably securable to said door frame section.

8. The vehicle soft top of claim 7 wherein said vehicle has an open channel member extending substantially vertically along said door frame section and said panel has an elongated belt member attached along said third side and removably receivable in said channel member.

9. The vehicle soft top of claim 7 wherein said vehicle has a body portion with a substantially horizontally extending section and said panel has a fourth side removably securable to said horizontally extending section.

10. The vehicle soft top of claim 9 wherein said vehicle has an open channel member extending substantially horizontally along said horizontally extending section and said panel has an elongated belt member attached along said fourth side and removably receivable in said channel member.

11. The vehicle soft top of claim 1 wherein said soft top is mountable on a vehicle having a body portion with a substantially horizontally extending section and said panel has another side removably securable to said horizontally extending section.

12. The vehicle soft top of claim 11 wherein said vehicle has an open channel member extending substantially horizontally along said horizontally extending section and said panel has an elongated belt member attached along said another side and removably receivable in said channel member.

13. The vehicle soft top of claim 1 wherein the first side of the cutout section of said main body extends substantially horizontally along an axis and said second side thereof extends substantially downwardly of said axis.

14. The vehicle soft top of claim 1 wherein the stem portion and hook portion of the interconnecting member attached to said main body depends downwardly from the first side of said main body with said hook portion opening upwardly.

15. The vehicle soft top of claim 14 wherein the stem portion and hook portion of the interconnecting member attached to the panel extend upwardly from the first side of said panel with said hook portion opening downwardly.

16. The vehicle soft top of claim 1 wherein the elongated hook portions of said interconnecting members respectively extend along axes and said axes are substantially collinear with the hook portions overlapping one another to secure said first sides of said panel and main body together.

17. The vehicle soft top of claim 16 wherein said hook portions interlock with one another to prevent disengagement of the first sides of said panel and main body from each other in a direction substantially perpendicular to said axes.

18. The vehicle soft top of claim 16 wherein said hook portions are releasable from one another in a direction substantially perpendicular to said axes.

19. The vehicle soft top of claim 1 wherein said panel is flexible and can be collapsed to a position adjacent the first side of the cutout section of said main body with the hook portions overlapping one another to secure said first sides of said panel and main body together.

20. The vehicle soft top of claim 19 further including a tie arrangement to secure said panel in said position adjacent the first side of the cutout section of said main body.

21. The vehicle soft top of claim 1 wherein said interconnecting members are substantially identical in shape to each other.

22. A vehicle soft top having a main body and a removable panel, said panel having a plurality of sides defining a perimeter shape and said main body having a cutout section to at least partially receive said panel, said cutout section being defined by at least first and second sides in said main body substantially conforming in shape to at least first and second sides of said panel, said panel and said main body being removably securable to each other along respective first sides by at least two overlapping, mating members and being removably securable to each other along respective second sides by a zipper, each mating member having a stem portion and a hook portion, one of said mating members being attached to the main body of the vehicle soft top along the first side thereof with the stem portion and hook portion being elongated in a direction along said first side, another of said mating members being attached to said panel along the first side thereof with the stem portion and hook portion being elongated in a direction along said first side, said hook portion of said panel being receivable in the hook portion of said main body in an overlapping manner to secure said first sides together and said zipper operated to secure said second sides together.

23. The vehicle soft top of claim 22 wherein said mating members are substantially identical in shape to one each other.

24. The vehicle soft top of claim 22 wherein the stem portion and hook portion of the mating member attached to said main body depends downwardly from the first side of said main body with said hook portion opening upwardly.

25. The vehicle soft top of claim 24 wherein the stem portion and hook portion of the mating member attached to the panel extend upwardly from the first side of said panel with said hook portion opening downwardly.

26. The vehicle soft top of claim 22 wherein the elongated hook portions of said mating members respectively extend along axes and said axes are substantially collinear with the hook portions overlapping one another to secure said first sides of said panel and main body together.

27. The vehicle soft top of claim 26 wherein said hook portions interlock with one another to prevent disengagement of the first sides of said panel and main body from each other in a direction substantially perpendicular to said axes.

28. The vehicle soft top of claim 26 wherein said hook portions are releasable from one another in a direction substantially perpendicular to said axes.

29. The vehicle soft top of claim 22 wherein the first side of the cutout section of said main body extends substantially horizontally along an axis and said second side thereof extends substantially downwardly of said axis.

30. The vehicle soft top of claim 22 wherein said panel and said cutout section of said main body have respective third sides and said soft top further includes a zipper to removably secure said third sides together.

31. The vehicle soft top of claim 22 wherein said soft top is mountable on a vehicle and said panel has another side removably securable to said vehicle.

32. The vehicle soft top of claim 31 wherein said vehicle has an elongated, open channel member and said panel has an elongated belt member attached along said another side and removably receivable in said channel member.

33. In a vehicle soft top with a main body and a panel, a method of removably securing said panel to said main body using at least two interconnecting members with respective stem and hook portions attached along respective first sides of said panel and a cutout section of said main body and at least one zipper between second sides of said panel and said cutout section of said main body, said method including:

(a) aligning ends of the hook portions in a overlapping manner, (b) sliding the hook portion attached to said panel relative to the hook portion attached to said main body to a first position securing said first sides of said panel and main body together, and (c) operating said zipper to secure said second sides of said panel and main body together.

34. The method of claim 33 further including providing a zipper between third sides of said panel and cutout section of said main body and operating said zipper to secure said third sides together.

35. The method of claim 34 further including aligning said second and third sides of said panel in a substantially parallel relationship and said first sides thereof substantially perpendicular thereto.

36. The method of claim 33 further including mounting said soft top on a vehicle and securing said panel along another side thereof to said vehicle.

37. The method of claim 36 further including securing said another side of said panel to said vehicle using an elongated, open channel member on said vehicle and an elongated belt member attached along said another side of said panel and removably receivable in said channel member.

* * * * *